(12) United States Patent
Sharp et al.

(10) Patent No.: US 8,786,616 B2
(45) Date of Patent: Jul. 22, 2014

(54) PARALLEL PROCESSING FOR DISTANCE TRANSFORMS

(75) Inventors: Toby Sharp, Cambridge (GB); Antonio Criminisi, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 555 days.

(21) Appl. No.: 12/635,861

(22) Filed: Dec. 11, 2009

(65) Prior Publication Data

US 2011/0141121 A1   Jun. 16, 2011

(51) Int. Cl.
G06F 15/80 (2006.01)
G06K 9/34 (2006.01)
G06K 9/46 (2006.01)

(52) U.S. Cl.
USPC ............................ 345/505; 382/173; 382/195

(58) Field of Classification Search
USPC ......................................................... 345/505
See application file for complete search history.

(56) References Cited

U.S. PATENT DOCUMENTS

| 5,786,826 A | 7/1998 | Kwok |
| 6,249,288 B1 | 6/2001 | Campbell |
| 2009/0074238 A1 | 3/2009 | Pfister et al. |
| 2009/0290795 A1* | 11/2009 | Criminisi et al. ............. 382/173 |

FOREIGN PATENT DOCUMENTS

WO   WO2008099400(A2)   8/2008

OTHER PUBLICATIONS

Parker, J.R., Baumback, M, "Visual Hand Pose Identification for Intelligent User Interfaces", proceedings of 16th international conference on Vision Interface ,Halifax, Nova Scotia, Canada, Jun. 2003.*
Pekka J. Toivanen. 1996. New geodesic distance transforms for grayscale images. Pattern Recogn. Lett. 17, 5 (May 1996), 437-450.*
Antonio Criminisi, Toby Sharp, and Andrew Blake. Oct. 2008. GeoS: Geodesic Image Segmentation. In Proceedings of the 10th European Conference on Computer Vision: Part I (ECCV '08), David Forsyth, Philip Torr, and Andrew Zisserman (Eds.). Springer-Verlag, Berlin, Heidelberg, 99-112.*
G. Borgefors. Distance transformations in digital images. Computer Vision, Graphics and Image Processing, 34:344-371, 1986.*
A.N. Kolesnikov and E.V. Trichina, "The parallel algorithm for thinning of binary images", Optoelectronics, Instrumentation and Data Processing, No. 6, 7-13, 1995.*

(Continued)

Primary Examiner — Kee M Tung
Assistant Examiner — Zhengxi Liu
(74) Attorney, Agent, or Firm — Pablo Tapia; Jim Ross; Micky Minhas (57) ABSTRACT

Parallel processing for distance transforms is described. In an embodiment a raster scan algorithm is used to compute a distance transform such that each image element of a distance image is assigned a distance value. This distance value is a shortest distance from the image element to the seed region. In an embodiment two threads execute in parallel with a first thread carrying out a forward raster scan over the distance image and a second thread carrying out a backward raster scan over the image. In an example, a thread pauses when a cross-over condition is met until the other thread meets the condition after which both threads continue. In embodiments distances may be computed in Euclidean space or along geodesics defined on a surface. In an example, four threads execute two passes in parallel with each thread carrying out a raster scan over a different quarter of the image.

20 Claims, 10 Drawing Sheets

(56) References Cited

OTHER PUBLICATIONS

Criminisi, Sharp, Blake, "GeoS: Geodesic Image Segmentation", Microsoft Research, Cambridge, ECCV 2008, pp. 99-112.

Ducourthial, Merigot, Sicard, "Parallelizing image analysis algorithms: ANET solution and performances", retrieved on Dec. 2, 2009 at http://perso.efrei.fr/~sicard/download/files/CAMP05.pdf, IEEE Proceedings of the Seventh International Workshop on Computer Architecture for Machine Perception (CAMP 2005), Jul. 4, 2005, pp. 277-282.

Forsmoo, "The Distance Transform Algorithm on a Two-Processor Computer", retrieved on Dec. 2, 2009 at <<http://ieeexplore.ieee.org/stamp/stamp.jsp?tp=&arnumber=797580&isnumber=17274>>, 10th International Conference on Image Analysis and Processing (ICIAP1999), Sep. 27, 1999, pp. 114-118.

Grevera, "The "dead reckoning" signed distance transform", Elsevier Inc., Computer Vision and Image Understanding 95, 2004, pp. 317-333.

Sengupta, Harris, Garland, "Efficient Parallel Scan Algorithms for GPUs", retrieved on Dec. 2, 2009 at <<http://mgarland.org/files/papers/nvr-2008-003.pdf>>, NVIDIA Technical Report NVR-2008-003, Dec. 2008, pp. 1-17.

Staubs, Fedorov, Linardakis, Dunton, Chrisochoides, "Parallel N-Dimensional Exact Signed Euclidean Distance Transform", retrieved on Dec. 2, 2009 at <<http://crtc.wm.edu/papers/journal_23.pdf, The Insight Journal, Dec. 2006, pp. 1-5.

\* cited by examiner

PARALLEL PROCESSING FOR DISTANCE TRANSFORMS

BACKGROUND

Many distance transform algorithms are known which take a 2D, 3D or higher dimensional image comprising one or more objects and produce a distance image, corresponding to the input image and having a distance value at each image element. The distance transform algorithm aims to assign points in the distance image the minimum distance from that particular point to the nearest point on the border of any object in the input image. In some cases every point in the distance image is assigned a distance value and this includes points within objects as well as those in the background. For example, the sign of the assigned distance value may indicate whether the point is inside or outside an object.

Distance transforms are required in many image processing application domains including but not limited to medical image analysis, analysis of images of natural scenes, robotics, ray-tracing, automated classification of biological images, hands-free user interfaces, and others.

Various types of distance transforms are known such as Euclidean and Geodesic distance transforms. For example, the shortest geodesic distance between two points in an image may be one that travels around a region of high gradient rather than a Euclidean shortest path which travels "as the crow flies".

There is a desire to provide distance transform engines that operate in real time and with high levels of accuracy.

The embodiments described below are not limited to implementations which solve any or all of the disadvantages of known distance transform engines.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Parallel processing for distance transforms is described. In an embodiment a raster scan algorithm is used to compute a distance transform such that each image element of a distance image is assigned a distance value. This distance value is a shortest distance from the image element to a seed region. In an embodiment two threads execute in parallel with a first thread carrying out a forward raster scan over the distance image and a second thread carrying out a backward raster scan. In an example, a thread pauses when a cross-over condition is met until the other thread meets the condition after which both threads continue. For example, distances may be computed in Euclidean space or along geodesics defined on a surface. In an example, four threads execute two passes in parallel with each thread carrying out a raster scan over a different quarter of the image.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a distance transform system for Euclidean or Geodesic distances, the system described is provided as an example and not a limitation. As those skilled in the art will appreciate, the present examples are suitable for application in a variety of different types of distance transform systems for use in image and/or video processing systems and for other applications.

The term "image element" is used to refer to a pixel, group of pixels, or other higher level component of an image.

The term "geodesic distance" is used herein to refer to a distance between two points in an image which takes into account image content. For example, consider the intensities of the image elements as a height map. The shortest geodesic distance between two points in an image may then be one that travels around a region of high gradient rather than a Euclidean shortest path which travels "as the crow flies". In the embodiments described herein the geodesic distances take into account intensity gradients in an image. However, it is also possible to use geodesic distances which take into account gradients of other sources of information, such as texture gradients, colour gradients, or gradients of probability maps.

Figure 1:
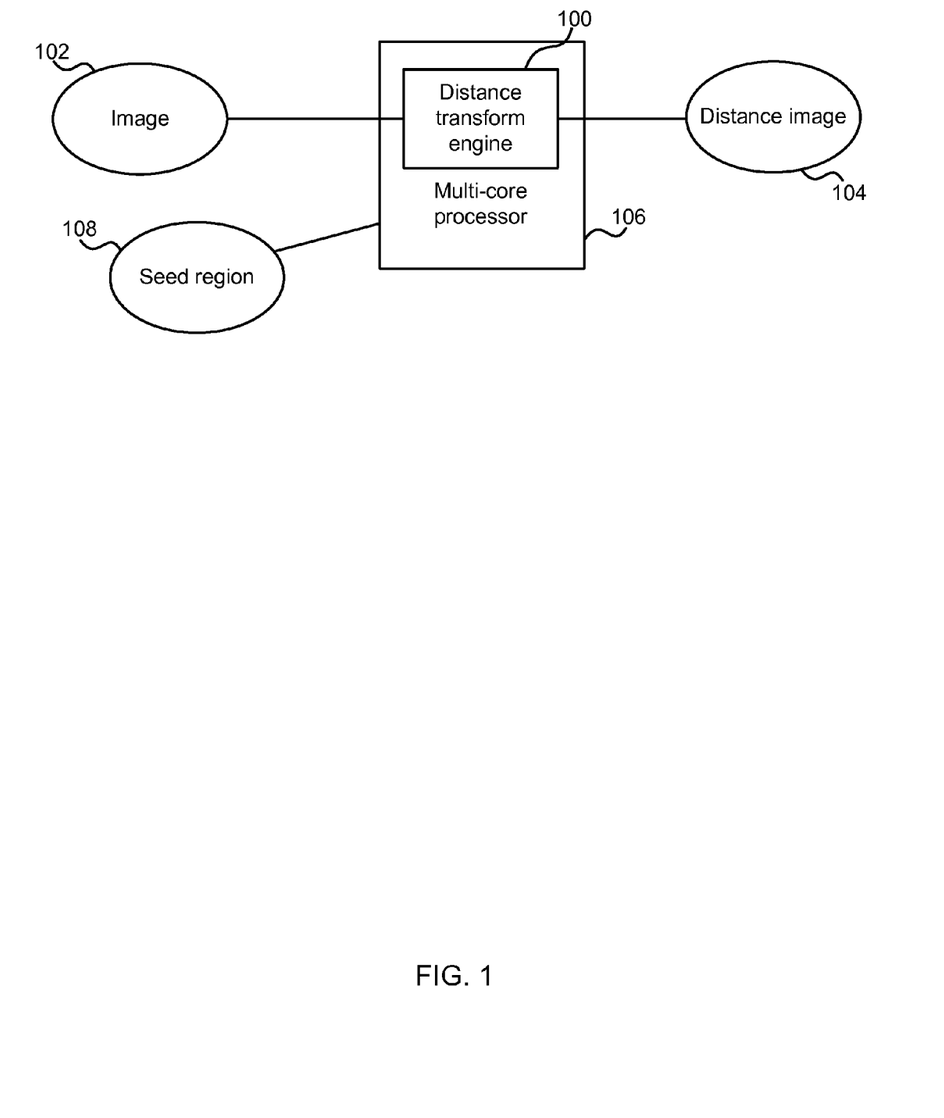
FIG. 1 is a schematic diagram of a distance transform engine implemented at a multi-core processor.

FIG. 1 is a schematic diagram of a distance transform engine 100 implemented at a multi-core processor 106. An image 102 or sequence of images in the case of a video, is provided as input to the system 106. The image 102 may be a colour image, a grayscale image, a medical image or any other type of image. Also, the input image may have more than 2 dimensions. For instance it can be a 3D medical volume or a video (a space-time parallelepiped). The image may be stored using a data structure such as a 2D array of image element values (such as a plain pixel grid) or a higher dimensional array of image element values. Also available to the distance transform engine 100 is a seed region 108 which may be provided as an input or may be computed automatically by the engine 100 without the need for user input. It is also possible for the seed region to be computed by the distance transform engine using some user input.

The output of the distance transform engine is a distance image 104 which corresponds to the input image 102 and comprises a distance value at each image element location. For example, the distance value may be a geodesic shortest path distance to the seed region 108.

This seed region 108 may be a single point in some examples. In other examples it may be a defined image region such as provided by a binary segmentation mask or in any other manner. In other examples, the seed region 108 is "soft" in that it is defined probabilistically. In this case a probability distribution is used to model the belief that a given image element belongs to the seed region.

In some examples the seed region is associated with an object of interest in the image such as a foreground object region. In these cases the resulting distance image 104 may comprise a "blank" region corresponding to the seed region 108. A processing engine which uses the distance image 104 as input is then able to easily selectively process background regions of the image outside the foreground seed region. However, this is not essential.

The distance transform engine 100 is arranged to apply a raster scan process in order to produce the distance image 104. A raster scan algorithm is one which is based on a kernel operation applied sequentially over the image in multiple passes. By its very nature such an algorithm requires sequential processing and is therefore difficult to exploit parallel architectures when implementing raster scan techniques.

Figure 2:
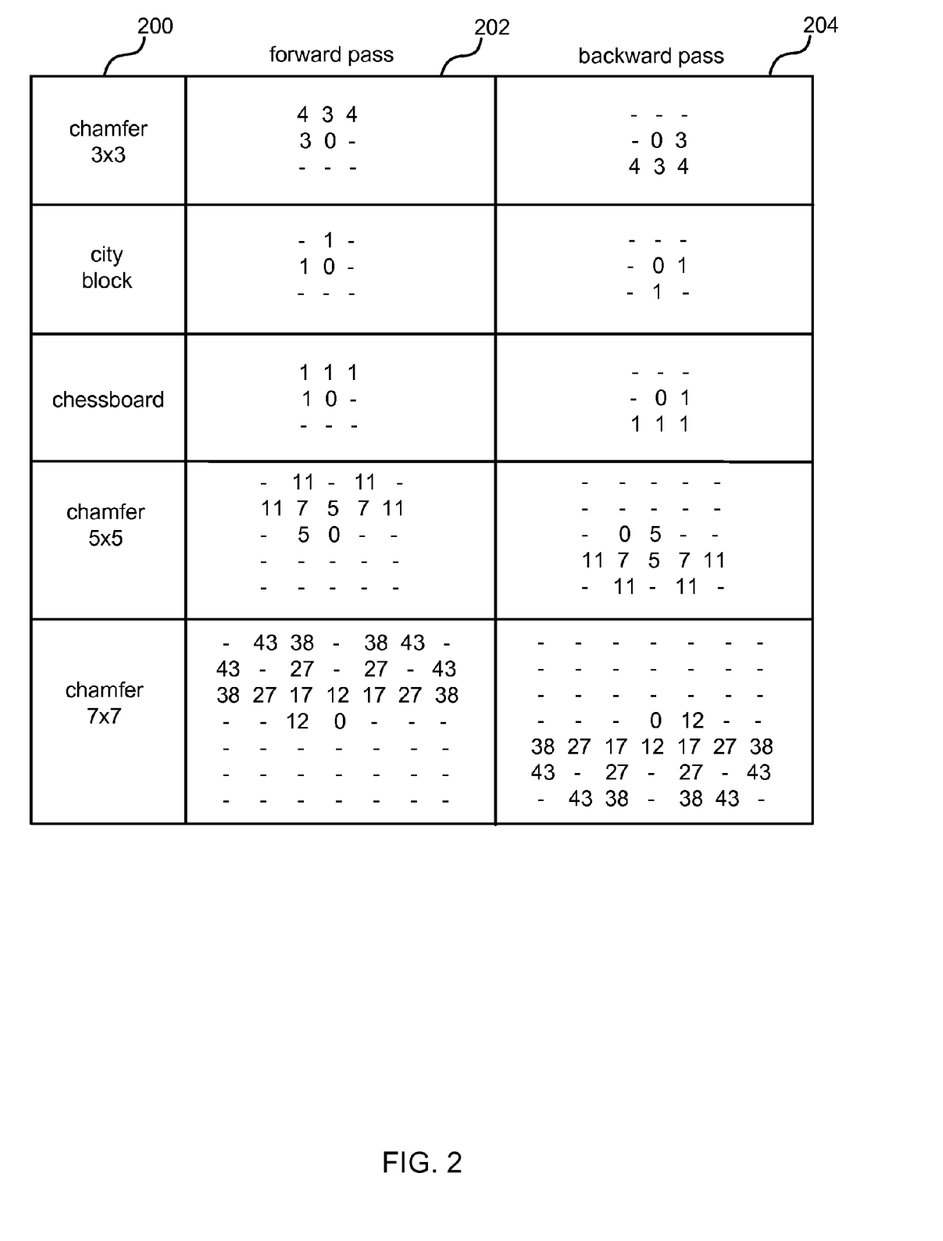
FIG. 2 is a table showing examples of different windows for use by a distance transform engine.

Distance transforms with various different metrics may be computed using raster scan algorithms by using windows or kernels of various different types and sizes. FIG. 2 shows five different pairs of windows for use by a particular raster scan algorithm referred to herein as the Chamfer Distance algorithm. Each pair comprises a window 202 for a forward pass of the process and a window 204 for a backward pass of the process. The five pairs of windows 200 are referred to herein as chamfer 3×3, city block, chessboard, chamfer 5×5 and chamfer 7×7. In each window, "0" indicates the center of the window and "-" indicates a point that is not used. An example chamfer distance algorithm process is described below with reference to FIG. 3.

Figure 3:
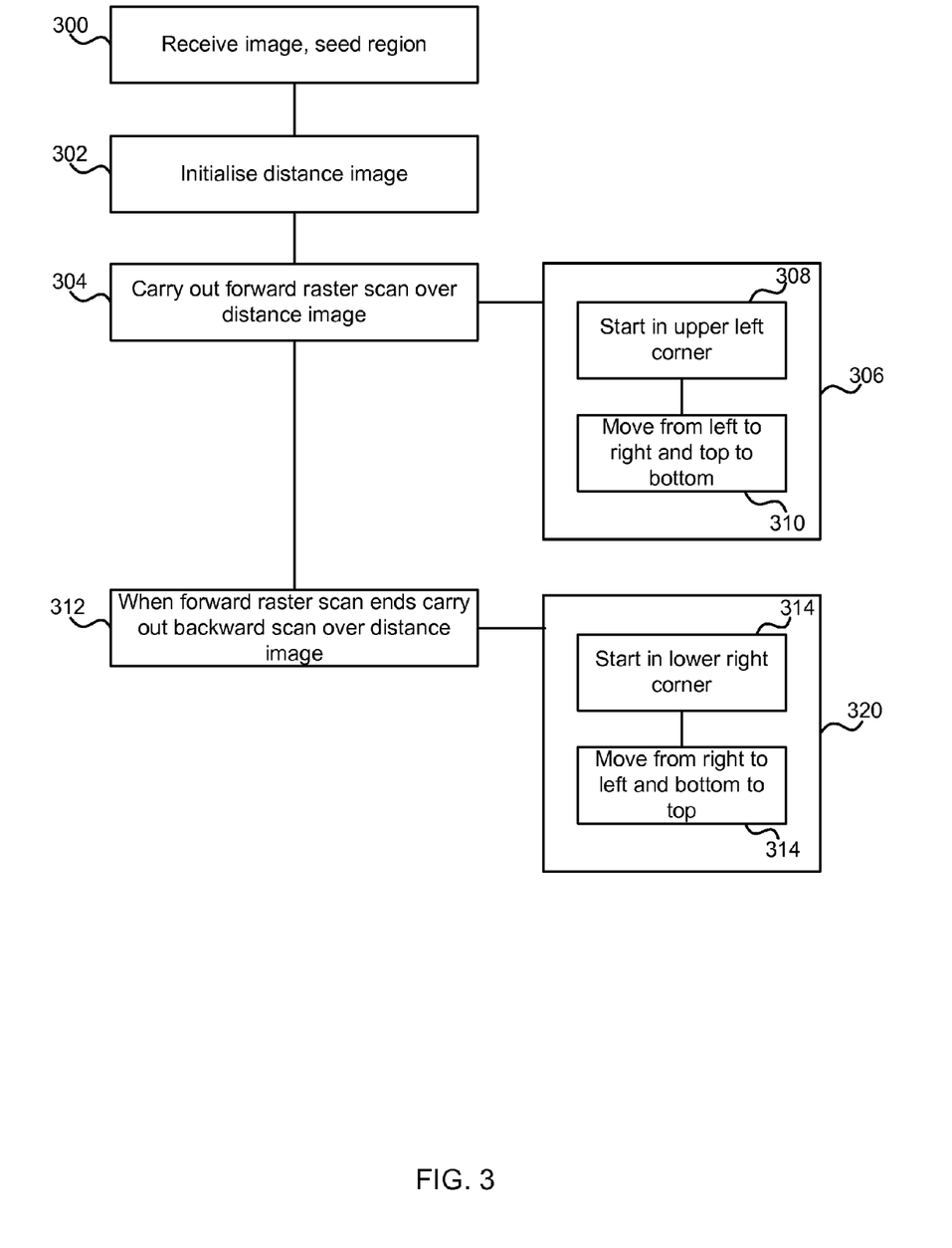
FIG. 3 is a flow diagram of an example method at a distance transform engine.

According to FIG. 3 the distance transform engine receives 300 an image and a seed region. For example, in the case that a Euclidean distance transform is to be provided the input may be a seed image which specifies which image elements are in the seed region; for example, the seed image may be binary or real-valued. In the case that a geodesic distance transform is to be provided the input may be a seed image and a height image. The distance transform engine initializes the distance image 302. For example, all image elements within the seed region may be set to zero and all other image elements of the distance image may be set to infinity. Other ways of initializing the distance image may be used.

A pair of windows for the raster scan are selected. For example, these may be the chamfer 3×3 forward pass and backward pass windows illustrated in FIG. 2. The distance transform engine begins a forward raster scan 304, 306 over the distance image. It begins 308 in the upper left corner of the image and places the forward pass window on the distance image such that the center of the window is in registration with the first image element (in the top left corner). The kernel operation is carried out as described in more detail below. The window is then moved to the right so that the center of the window is in registration with the second image element of the top row and the kernel operation is carried out. This process repeats with the window moving from left to right along each row and from the top row to 310 the bottom row of the distance image. When the forward raster scan ends 312 the distance transform engine then carries out a backward raster scan 320 over the distance image. The backward raster scan begins 314 in the lower right corner of the distance image and moves 316 from right to left and bottom to top.

The kernel operation comprises replacing the distance image element which falls under the central image element of the window by the minimum of four distance values, those distance values being for the image element locations specified by the window. For example, the kernel operation for a Euclidean distance transform using the chamfer 3×3 window may be represented in pseudo code as follows:

Suppose I is a 2D binary image of size X by Y which is to be used to form a distance image M which is a 2D grey image of size X by Y.

Local distance $p_1$ is set to 3 (according to the window selected from FIG. 2) and represents the distance between two adjacent pixels in either the x or y direction Local distance $p_2$ is set to 4 (according to the window selected from FIG. 2) and represents the diagonal distance between two diagonally adjacent pixels. Setting $p_1$ to 3 and $p_2$ to 4 involves using an integer approximation to the ratio 1:root 2. Besides the {3, 4} approximation other integer approximations may be used or floating point values may be used for the values of $p_1$ and $p_2$.

As mentioned above, the distance image is initialized prior to the forward pass, for example, by setting the image elements in the seed region to 0 and infinity elsewhere.

```
//perform the first (forward) pass
for y = 1 to Y do begin
    for x = 1 to X do begin
        if (M(x−1, y−1)   + p₂ < M (x,y))then M (x,y) = M (x−1, y−1)   + p₂
        if (M(x,y−1)      + p₁ < M (x,y))then M (x,y) =    M (x,y−1)   + p₁
        if (M (x+1, y−1)  + p₂ < M (x,y))then M (x,y) = M (x+1, y−1)   + p₂
        if (M (x−1,y)     + p₁ < M (x,y))then M (x,y) =    M (x−1,y)   + p₁
    end
end
//perform the final (backward) pass
for y = Y to 1 do begin
    for x = X to 1 do begin
        if (M (x+1,y)     + p₁ < M (x,y))then M (x,y) = M (x−1,y) + p₁
        if (M (x−1,y+1)   + p₂ < M (x,y))then M (x,y) =    M (x−1,y+1)   + p₂
        if (M (x,y+1)     + p₁ < M (x,y))then M (x,y) = M (x,y+1) + p₁
        if (M (x+1,y+1)   + p₂ < M (x,y))then M (x,y) =    M (x+1,y+1)   + p₂
    end
end
```

Figure 4:
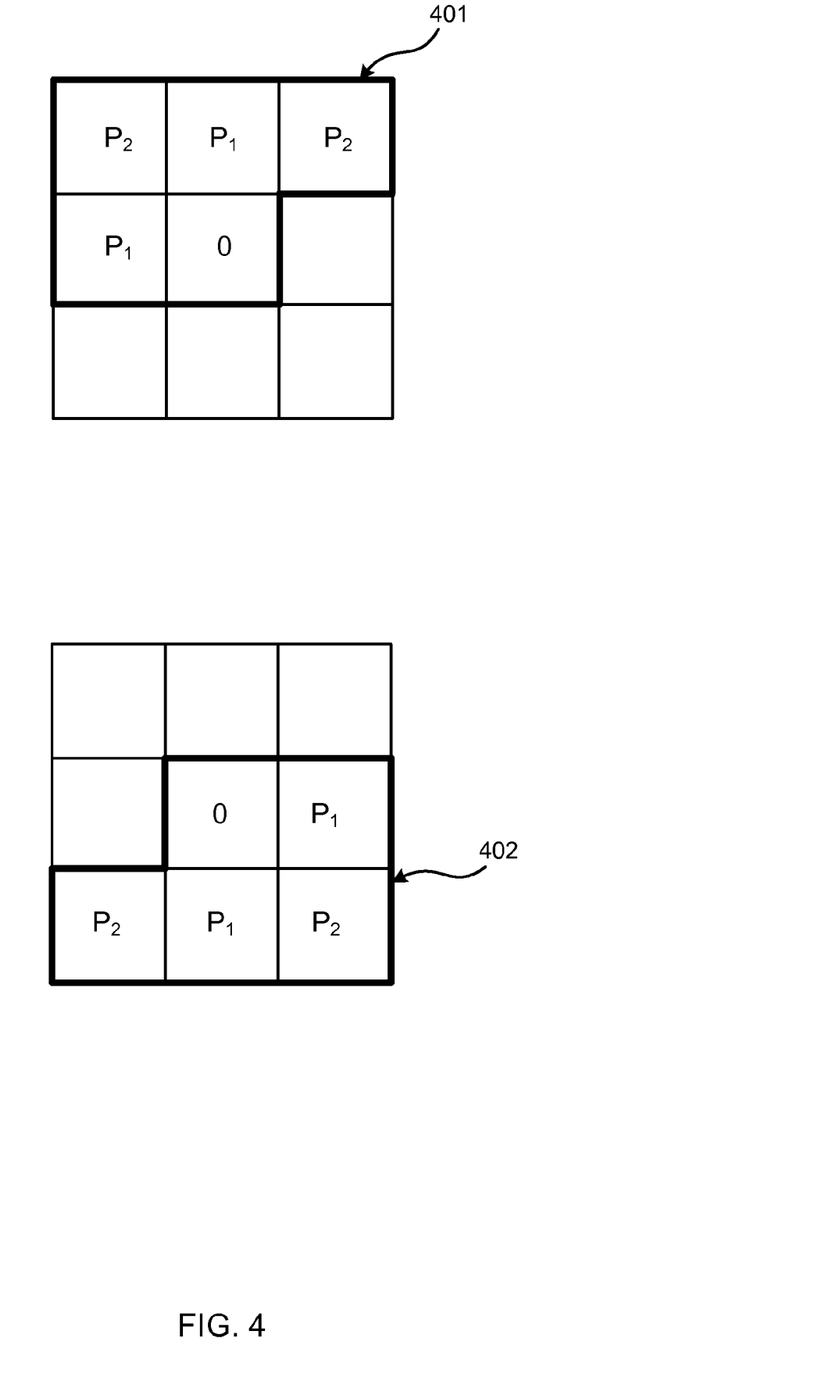
FIG. 4 is a schematic diagram of a forward and backward mask of a raster scan.

The kernel operation may be modified for different types of distance transform. For example, in the case that a geodesic distance transform is used with a seed image I that is defined exactly, with H being a height image and with the Euclidean metric where the image elements are square, the kernel operation may be as follows:

$$c(x, y) = \min \begin{cases} c(x-1, y-1) + \sqrt{p_2^2 + \gamma^2(H(x,y) - H(x-1, y-1))^2} \\ c(x, y-1) + \sqrt{p_1^2 + \gamma^2(H(x,y) - H(x, y-1))^2} \\ c(x+1, y-1) + \sqrt{p_2^2 + \gamma^2(H(x,y) - H(x+1, y-1))^2} \\ c(x-1, y) + \sqrt{p_1^2 + \gamma^2(H(x,y) - H(x-1, y))^2} \\ vI \end{cases}$$

where the forward pass kernel 401 and backward pass kernel 402 are as illustrated in FIG. 4. The symbol γ represents the geodesic factor which weighs the contribution of the image gradient versus the spatial distances. The symbol v represents a scaling factor which may be set to any suitable value. Given a seed image I(x)∈[0, 1] in the forward pass the map is scanned with a 3×3 kernel from the top-left to the bottom-right corner and the intermediate function c(x,y) is iteratively constructed. The $p_1$ and $p_2$ local distances may be set to $p_1=1$ and $p_2=\sqrt{2}$ or any suitable value for these local distances may be used as discussed above In the backward pass the algorithm proceeds right-to-left along scanlines from the bottom-right to the top-left corner and applies the backward kernel to c(x,y) to produce the final distance image. Larger kernels produce better approximations to the exact distance with increasing accuracy.

Figure 5:
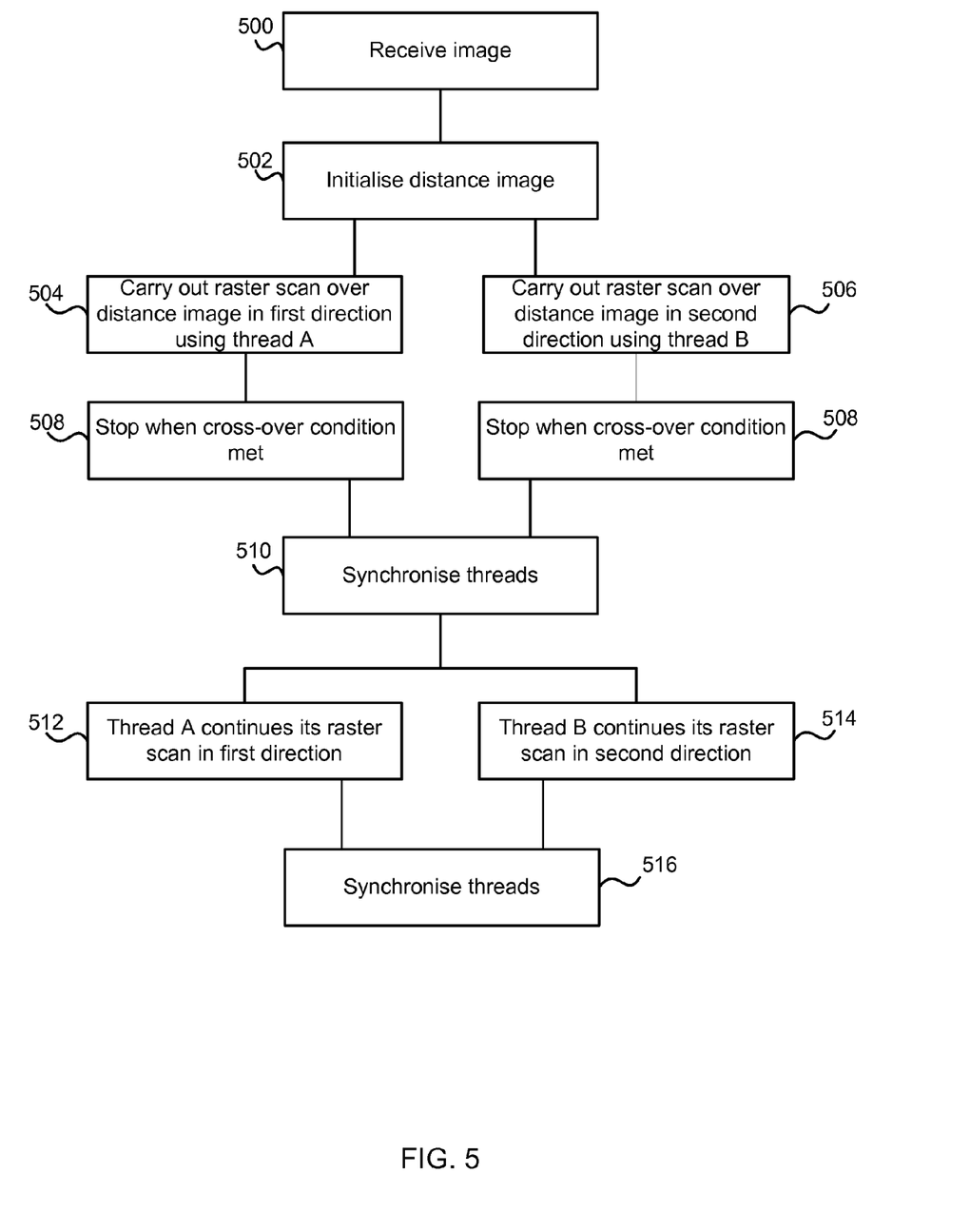
FIG. 5 is a flow diagram of an example method at a distance transform engine using a pair of threads.

In order to make use of parallel processing the distance transform engine may be arranged to use two threads which may execute in parallel as now described with reference to FIG. 5. This process is applicable for 2D, 3D or higher dimensional images and for geodesic or Euclidean distance transforms with any of the metrics mentioned in FIG. 2 or other metrics. It also applies where the seed region is defined probabilistically.

The distance transform engine receives 500 an image. In the case of a Euclidean distance transform this image may be a seed image specifying which image elements are in the seed region. In the case of a geodesic distance transform this image may be a height image (also known as height map). In that case a seed region is also received or automatically computed.

A single distance image is initialized in memory 502 and this is to be shared by each thread. The two threads are referred to here as thread A and thread B and these execute in parallel using any suitable processors which may be integral or distributed. One of the threads, say thread A carries out a raster scan 504 over the distance image in a first direction. The raster scan is a kernel operation applied sequentially as described above with reference to FIG. 3. Simultaneously thread B carries out a raster scan 506 over the distance image in a second direction. This raster scan uses the backward pass form of the kernel as mentioned above with reference to FIG. 3. Thread A stops its raster scan when a cross-over condition is met. For example, this cross-over condition may be that half the image elements of the distance image have been processed. The cross-over condition may be configured as a default, may be user set, may be that half or at least half of the image elements of the distance image have been processed, or may be configured as is appropriate for the user circumstances. Any other suitable cross-over condition may be used which is known to each thread. Thread B also stops its raster scan when it fulfils the cross-over condition. Each thread waits for the other thread to stop. Once both threads are stopped they are synchronized 510 in that they both know that each thread has stopped. By synchronizing the threads when the cross-over condition is met by both threads the possibility of incorrect results due to non-atomic read or write operations is prevented. The threads then continue their raster scans 512, 514 in their respective directions until the raster scans are complete at which point they are again synchronized 516. This final synchronization enables each thread to know that the transform has completed. The distance image then contains the required distance values. This is achieved by each raster scan processing each image element only once; that is, it is not necessary for either raster scan to repeat its raster scan over some or all of the image elements. In this way the process is simple and effective. In addition, the process is suitable for use where geodesic or Euclidean distance transforms are to be computed and where the seed region may be defined probabilistically.

Figure 6:
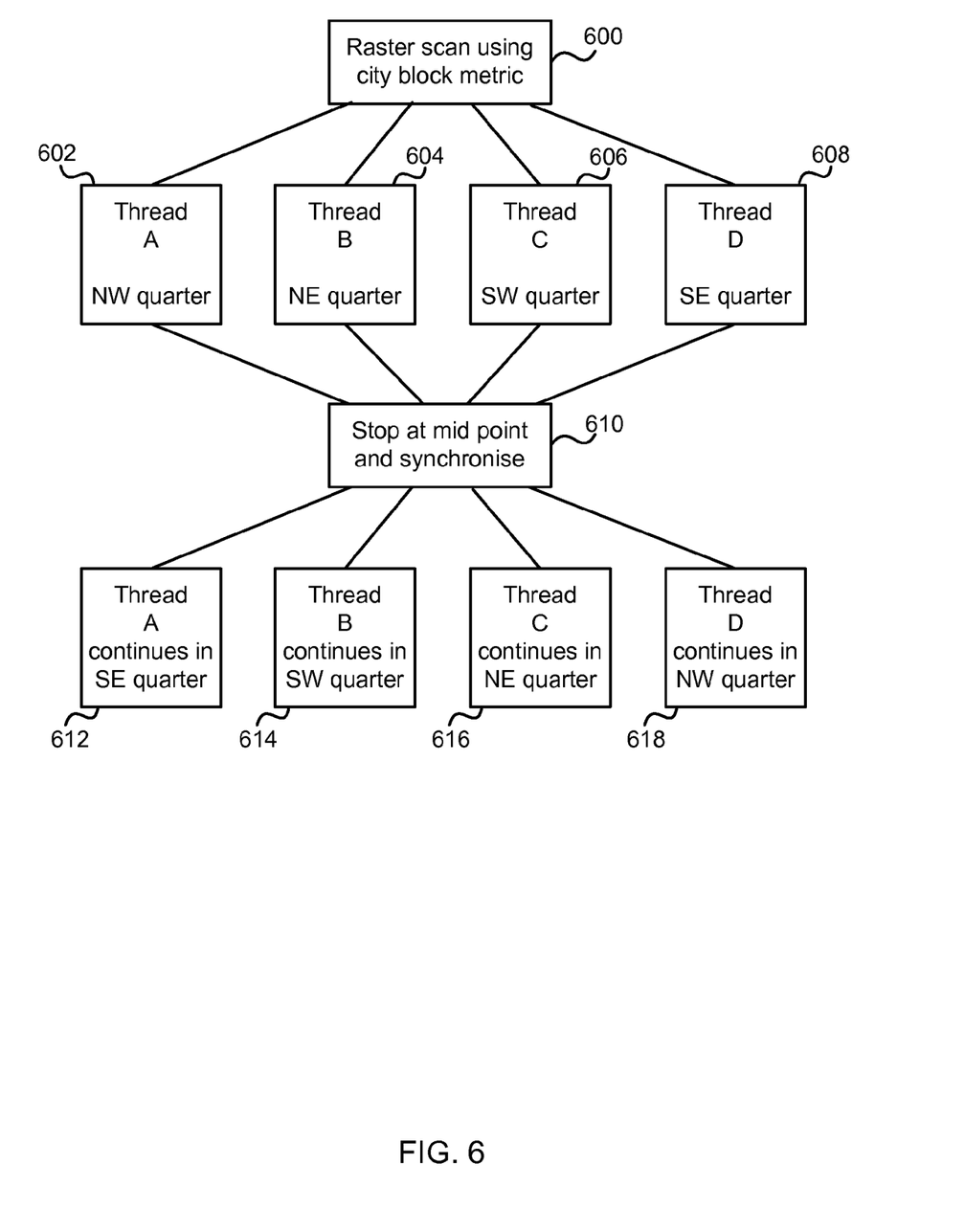
FIG. 6 is a flow diagram of an example method at a distance transform engine using four threads.

In another example, four threads are used which may execute in parallel. In this case the city block metric is used 600 and that metric is illustrated in FIG. 2. Each thread operates on a different quarter of the image as illustrated in FIG. 6. Four threads 602, 604, 606 and 608 are shown with thread A 602 operating on the north west quarter of the image, thread B operating on the north east quarter of the image, thread C operating of the south west quarter of the image and thread D operating of the south east quarter of the image. The threads begin their raster scans at the outer most corners of their image quarters and work towards the middle of the image in a forward pass. They stop at the middle of the image and wait for the other threads at synchronization step 610. The threads then continue their raster scans in a backward pass from the middle of the image back to the outer most corners of their image quarters.

Figure 7:
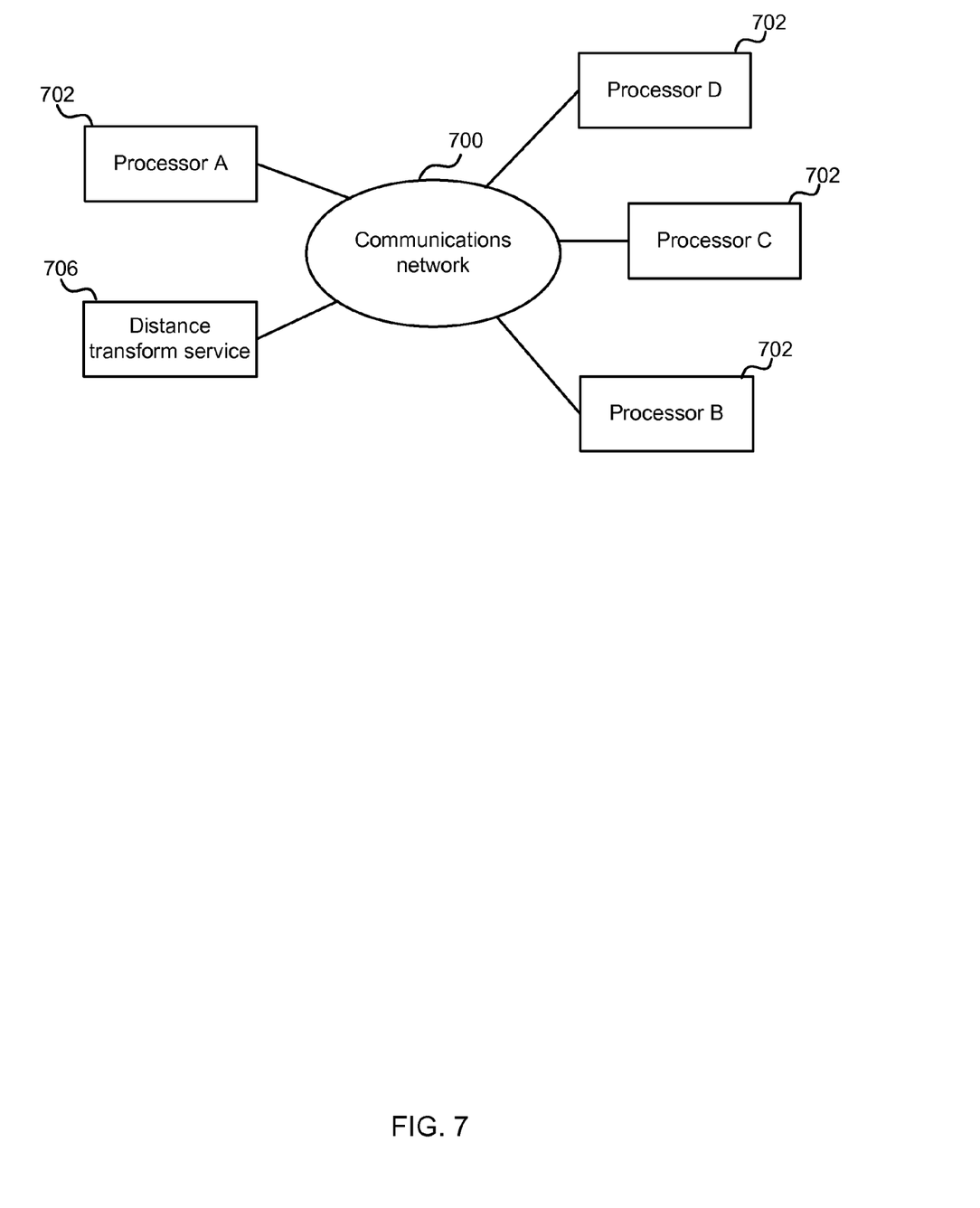
FIG. 7 is a schematic diagram of a distributed distance transform engine.

A distributed distance transform engine may be implemented as illustrated in FIG. 7 in which a plurality of processors 702 are provided connected by a communications network 700 of any suitable type. A distance transform service 706 is arranged to receive distance transform requests and to use various of the processors 702 to execute the threads of FIGS. 5 and 6 as required.

Figure 8:
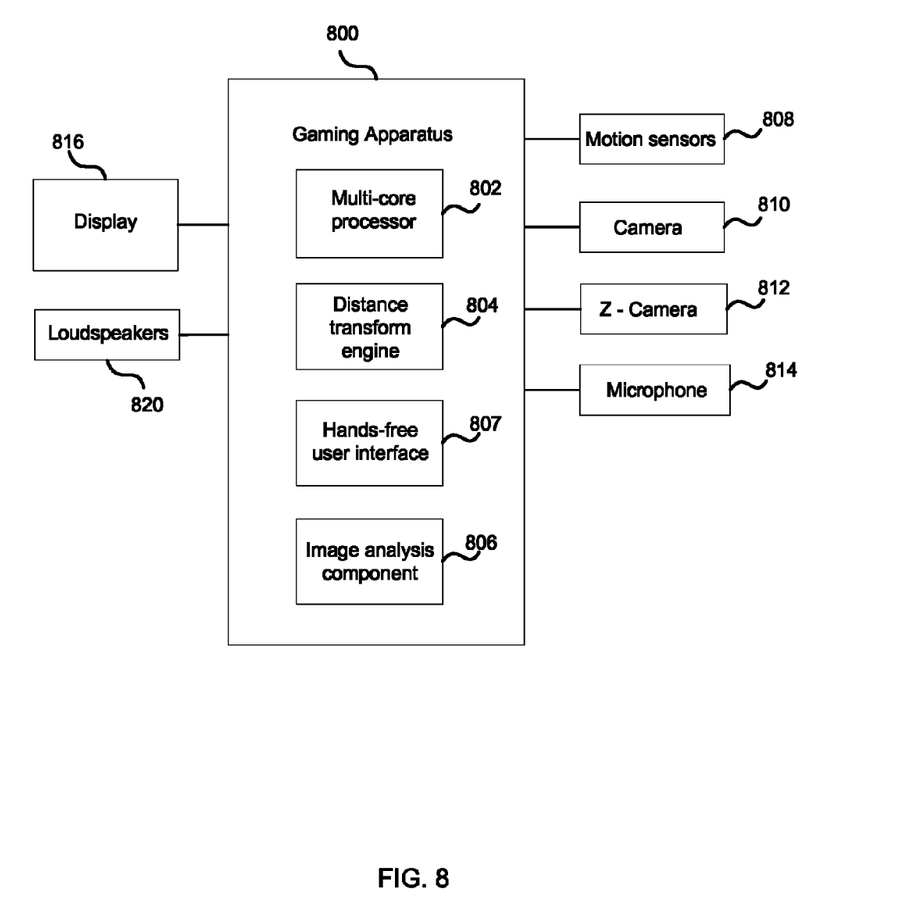
FIG. 8 is a schematic diagram of a gaming apparatus.

FIG. 8 is a schematic diagram of a gaming apparatus 800 incorporating a distance transform engine 804 such as the distance transform engine of FIG. 1. The gaming apparatus 800 is computer implemented and comprises a multi-core processor 802, a distance transform engine 804, an image analysis component 806 as well as a hands-free user interface 807. The gaming apparatus has inputs arranged to connect sensors which may be integral with the apparatus or may be in communication with the apparatus. For example, these sensors may comprise motion sensors 808, cameras 810 (of any type including but not limited to web cameras, video cameras, stereo cameras, z-cameras 812 (also known as depth cameras), microphones 814 or other types of sensors arranged to sense one or more users of the gaming apparatus 800 and/or the environment of the gaming apparatus. The gaming apparatus is arrange to use the sensor inputs to control multi-media display of gaming material at display devices which may be connected to or in communication with the gaming apparatus. For example the display devices comprise a display apparatus 816 such as a display screen and loudspeakers 820 although any display apparatus may be used. The gaming apparatus may comprise other components for enabling one or more users to play a game such as a video game and to play this with other players over a communications network.

The distance transform engine 804 receives images from the camera 810 and/or z-camera 812 and produces depth images for these as described herein. The images capture visual information of one or more users of the gaming apparatus. An image analysis component 806 at the gaming apparatus is able to use the depth images for image analysis tasks and provide the results of those tasks to a hands-free user interface component. Other sensor analysis components process sensor data from other sensors and this may also be used by the hands-free user interface component to control the gaming apparatus 800 and control output of the gaming apparatus 800 at the display devices.

By using the distance transform engine 804 together with the multi-core processor parallel processing is achieved which speeds up production of the distance image. The distance image may then be used by the image analysis component 806 for edge-aware image processing, image segmentation such as to segment an image into different players of a game, removing the background regions of an image such that foreground regions containing information about players can be processed further, providing a cartoon filter to enable an image of a scene to be depicted as a drawing or other image editing or image analysis tasks.

Figure 9:
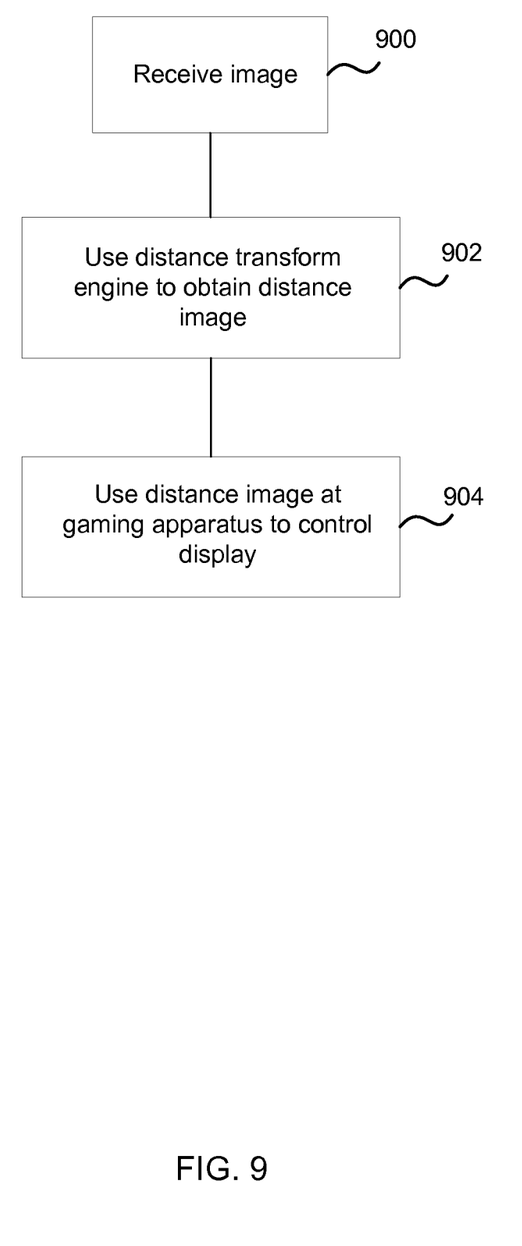
FIG. 9 is a flow diagram of a method at a gaming apparatus.

With reference to FIG. 9 a gaming apparatus such as that of FIG. 8 receives 900 an image of any type such as a depth image, video camera image, web camera image or other digital RGB image and uses the distance transform engine to form 902 a distance image. This is achieved quickly and accurately using parallel processing. The distance image is then used 904 at the gaming apparatus to control display devices and may be used as part of a hands-free user interface.

Figure 10:
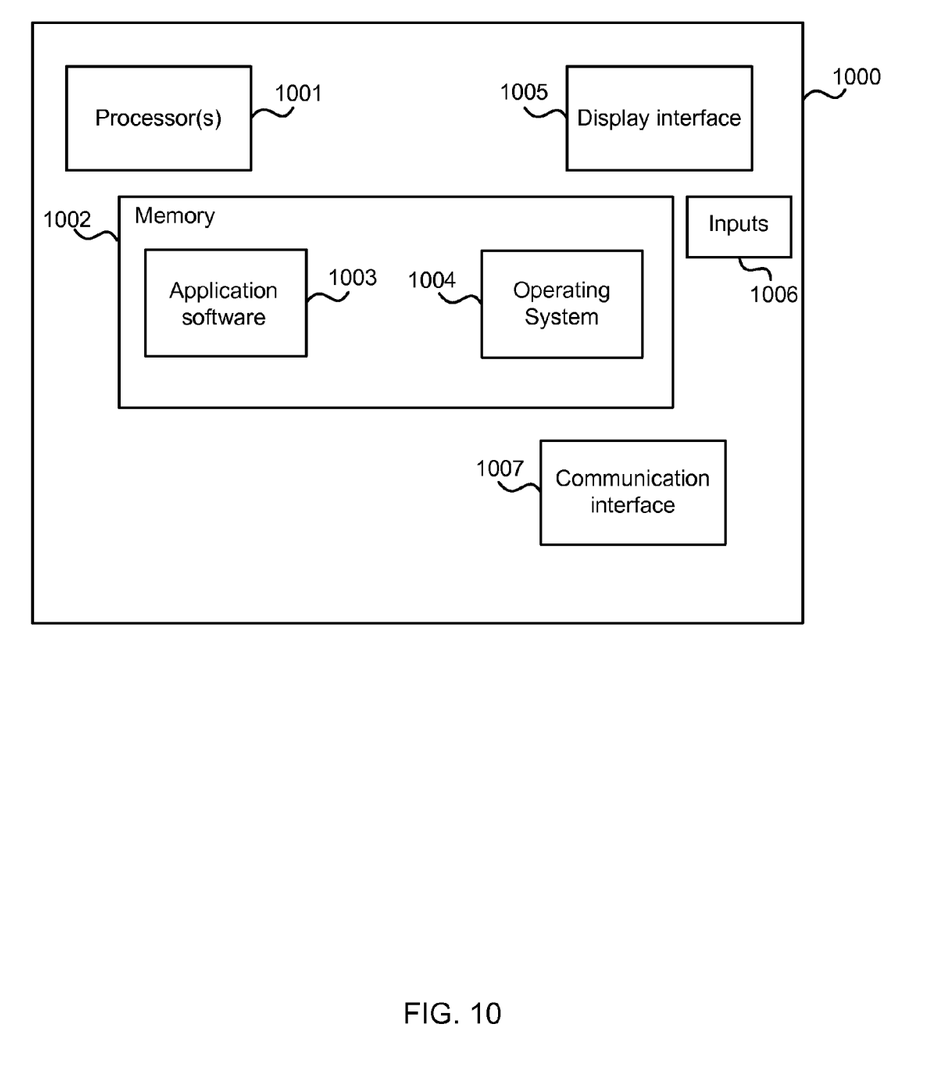
FIG. 10 illustrates an exemplary computing-based device in which embodiments of a distance transform engine may be implemented.

FIG. 10 illustrates various components of an exemplary computing-based device 1000 which may be implemented as any form of a computing and/or electronic device, and in which embodiments of a distance transform engine may be implemented.

The computing-based device 1000 comprises one or more inputs 1006 which are of any suitable type for receiving media content, Internet Protocol (IP) input, digital images of any suitable type, seed regions, gradient maps or other input. The device also comprises communication interface 1007 to enable it to communicate with other entities over a communications network. Those other entities may be other distance transform engines or may be processors arranged to carry out threads of execution for an aggregate distance transform process.

Computing-based device 1000 also comprises one or more processors 1001 which may be microprocessors, controllers or any other suitable type of processors for processing computing executable instructions to control the operation of the device in order to process an image to provide a distance transform for that image. Platform software comprising an operating system 1004 or any other suitable platform software may be provided at the computing-based device to enable application software 1003 to be executed on the device.

The computer executable instructions may be provided using any computer-readable media, such as memory 1002. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output via a display interface 1005 to a display system integral with or in communication with the computing-based device. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of processing an image, the method comprising:
   at an input, receiving a seed image the seed image specifying a seed region;
   storing a distance image in memory and initializing that distance image on the basis of the seed image;
   using at least one processor to execute at least two threads in parallel in order to carry out a raster scan algorithm to assign a geodesic distance value to each image element of the distance image that distance being a shortest geodesic distance from the image element to the seed region; wherein one of the threads executes a raster scan by moving a window over the distance image in a forward raster scan and another of the threads executes a raster scan by moving a second window over the distance image in a backward raster scan; and
   synchronizing the two threads when each thread's raster scan meets a cross-over condition, such that each image element of the distance image is processed at most a single time by the thread executing the forward raster scan and at most a single time by the thread executing the backward raster scan, each image element of the distance image being processed twice by the at least two threads combined.

2. A method as claimed in claim 1 wherein the cross-over condition is that half the image elements of the distance image have been processed.

3. A method as claimed in claim 1 which comprises receiving a height image and using the processor to assign geodesic distance values to the distance image using the height image.

4. A method as claimed in claim 1 wherein the image is selected from any of: a 2 dimensional image, a 3 dimensional image and an image of more than 3 dimensions.

5. A method as claimed in claim 1 wherein the distance image comprises a two dimensional or higher dimensional pixel grid.

6. A method as claimed in claim 1 wherein the step of receiving the seed image comprises obtaining a probability distribution describing belief about whether a given image element is a member of the seed region.

7. A method as claimed in claim 1 wherein the step of synchronizing the two threads comprises: when a first one of the thread's raster scan reaches the middle of the distance image pausing execution of that first thread until the second thread's raster scan reaches the middle of the distance image.

8. A method as claimed in claim 1 wherein the windows are arranged to provide a particular distance metric selected from any of: chamfer 3×3, city block, chessboard, chamfer 5×5 and chamfer 7×7.

9. A method as claimed in claim 1 wherein the windows are arranged to provide a city block metric and wherein the method comprises using the at least one processor to execute four threads in parallel with each thread executing a raster scan over a different quarter of the distance image, waiting to synchronize with the other threads and then continuing its raster scan over another quarter of the distance image.

10. A computer-implemented method of processing an image, the method comprising:
    at an input, receiving a seed image the seed image specifying a seed region and a height image;
    storing a distance image in memory and initializing that distance image on the basis of the seed region;
    using at least one processor to execute at least two threads in parallel in order to carry out a raster scan algorithm to assign a geodesic distance value to each image element of the distance image using the height image that distance being a geodesic shortest distance from the image element to the seed region; wherein one of the threads executes a raster scan by moving a window over the distance image in a forward raster scan and another of the threads executes a raster scan by moving a second window over the distance image in a backward raster scan; and
    synchronizing the two threads when each thread's raster scan meets a cross-over condition to enable each thread to complete processing by processing each image element of the distance image at most a single time, each image element of the distance image being processed twice by the at least two threads combined.

11. A method as claimed in claim 10 which is carried out at a gaming apparatus having a hands-free user interface, the method further comprising identifying at least two players based at least in part on the distance image.

12. A method as claimed in claim 10 wherein the cross-over condition is that half the image elements of the distance image have been processed.

13. A method as claimed in claim 10 wherein the step of receiving the seed image comprises obtaining a probability distribution describing belief about whether a given image element is a member of the seed region.

14. A method as claimed in claim 10 wherein the step of synchronizing the two threads comprises: when a first one of the thread's raster scan meets a cross-over condition pausing execution of that first thread until the second thread's raster scan meets the cross-over condition.

15. A method as claimed in claim 10 wherein the windows are arranged to provide a particular distance metric selected from any of: chamfer 3×3, city block, chessboard, chamfer 5×5 and chamfer 7×7.

16. A distance transform engine comprising:
    an input arranged to receive a seed image specifying a seed region and to receive a height image;
    a memory arranged to store a distance image;
    a processor arranged to initialize the distance image on the basis of the seed region;
    the processor being arranged to execute at least two threads in parallel in order to carry out a raster scan algorithm to assign a geodesic distance value to each image element of the distance image using the height image that geodesic distance being a shortest distance from the image element to the seed region;
    the processor being arranged such that one of the threads executes a raster scan by moving a window over the distance image in a forward raster scan and another of the threads executes a raster scan by moving a second window over the distance image in a backward raster scan; and wherein the processor is arranged to synchronize the two threads when each thread's raster scan meets a cross-over condition and when each thread's raster scan is completed, synchronizing the two threads when each thread's raster scan is completed indicating the distance image is completed, each image element of the distance image being processed twice by the two threads combined; and
    wherein the processor is arranged such that each raster scan comprises a sequence of kernel operations each kernel operation comprising selecting a minimum of a plurality of distances and assigning that minimum distance to an image element location currently in registration with the center of the window.

17. A distance transform engine as claimed in claim 16 wherein the processor is arranged to synchronize the two threads by: when a first one of the thread's raster scan meets a cross-over condition pausing execution of that first thread until the second thread's raster scan meets the cross-over condition.

18. A distance transform engine as claimed in claim 16 wherein the seed region comprises a probability distribution describing belief about whether a given image element is a member of the seed region.

19. A distance transform engine as claimed in claim 16 wherein the processor is arranged to use windows which provide a particular distance metric selected from any of: chamfer 3×3, city block, chessboard, chamfer 5×5 and chamfer 7×7.

20. A distance transform engine as claimed in claim 16 wherein the processor is arranged to execute four threads in parallel, with each thread executing a raster scan over a different quarter of the distance image, waiting to synchronize with the other threads and then continuing its raster scan over another quarter of the distance image.

* * * * *